US007965657B2

(12) United States Patent
Muharemovic et al.

(10) Patent No.: US 7,965,657 B2
(45) Date of Patent: Jun. 21, 2011

(54) SOUNDING REFERENCE SIGNAL CELL SPECIFIC SUB-FRAME CONFIGURATION

(75) Inventors: Tarik Muharemovic, Dallas, TX (US); Zukang Shen, Allen, TX (US); Pierre Bertrand, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 173 days.

(21) Appl. No.: 12/411,886

(22) Filed: Mar. 26, 2009

(65) Prior Publication Data

US 2009/0290514 A1 Nov. 26, 2009

Related U.S. Application Data

(60) Provisional application No. 61/039,571, filed on Mar. 26, 2008, provisional application No. 61/040,752, filed on Mar. 31, 2008, provisional application No. 61/041,694, filed on Apr. 2, 2008, provisional application No. 61/044,636, filed on Apr. 14, 2008, provisional application No. 61/045,421, filed on Apr. 16, 2008.

(51) Int. Cl.
*H04J 3/00* (2006.01)
*H04W 4/00* (2009.01)

(52) U.S. Cl. ............ 370/256; 370/280; 455/422.1
(58) Field of Classification Search ............ 370/203, 370/276, 280–282, 294, 295, 310, 310.2, 370/312, 314, 319, 321, 326–329, 336, 337, 370/340–344, 345, 347, 431, 442; 455/39, 455/179.1, 343.4, 509, 516, 524
See application file for complete search history.

(56) References Cited

U.S. PATENT DOCUMENTS

| | | | |
|---|---|---|---|
| 2004/0160936 A1* | 8/2004 | Liu et al. ............ | 370/348 |
| 2007/0270154 A1* | 11/2007 | Kim et al. ............ | 455/450 |
| 2009/0042616 A1* | 2/2009 | Teo et al. ............ | 455/562.1 |
| 2009/0181687 A1* | 7/2009 | Tiirola et al. ........ | 455/450 |
| 2009/0247229 A1* | 10/2009 | Teo et al. ............ | 455/562.1 |

* cited by examiner

*Primary Examiner* — Aung S Moe
*Assistant Examiner* — Prince Mensah
(74) *Attorney, Agent, or Firm* — Robert D. Marshall, Jr.; W. James Brady; Frederick J. Telecky, Jr.

(57) ABSTRACT

A method of wireless communication including a plurality of fixed basestations and a plurality of mobile user equipment with each basestation transmitting to any user equipment within a corresponding cell a sounding reference signal sub-frame configuration indicating sub-frames when sounding is permitted. Each user equipment recognizes the sounding reference signal sub-frame configuration and sounds only at permitted sub-frames. Differing cells may have differing sounding reference signal sub-frame configurations. There are numerous manners to encode the transmitted information.

23 Claims, 4 Drawing Sheets

$T_{SFC}=1$
$T_{SFC}=2$
$T_{SFC}=3$
$T_{SFC}=4$ $T_{SFC}=1$
$T_{SFC}=2$
$T_{SFC}=4$
$T_{SFC}=8$
$T_{SFC}=16$

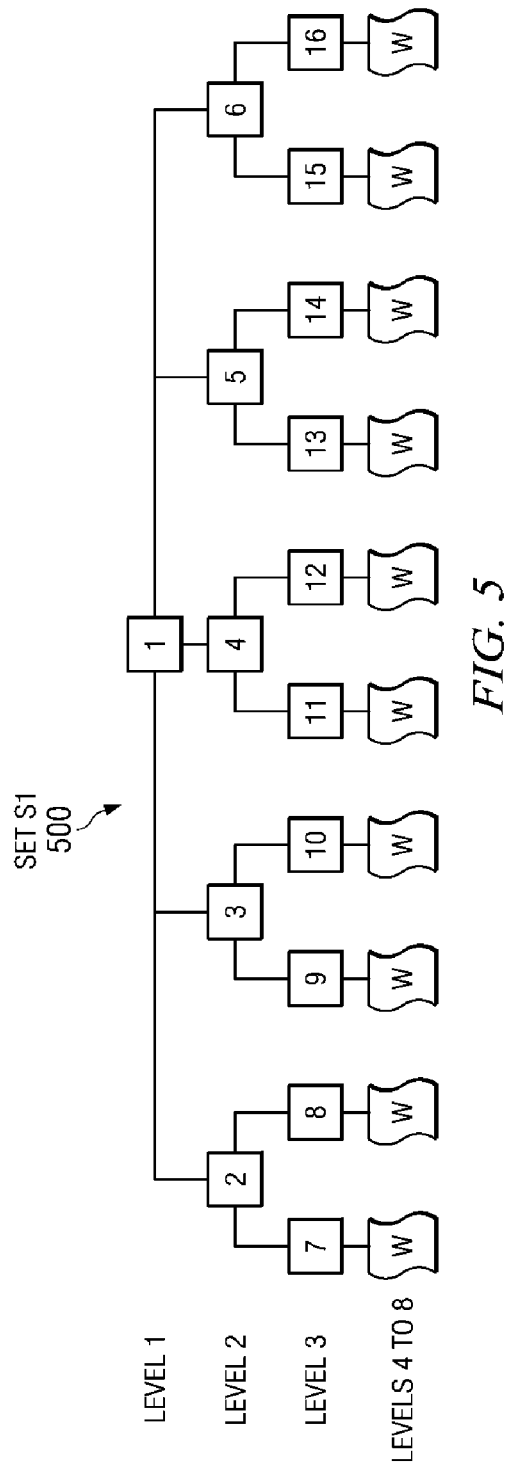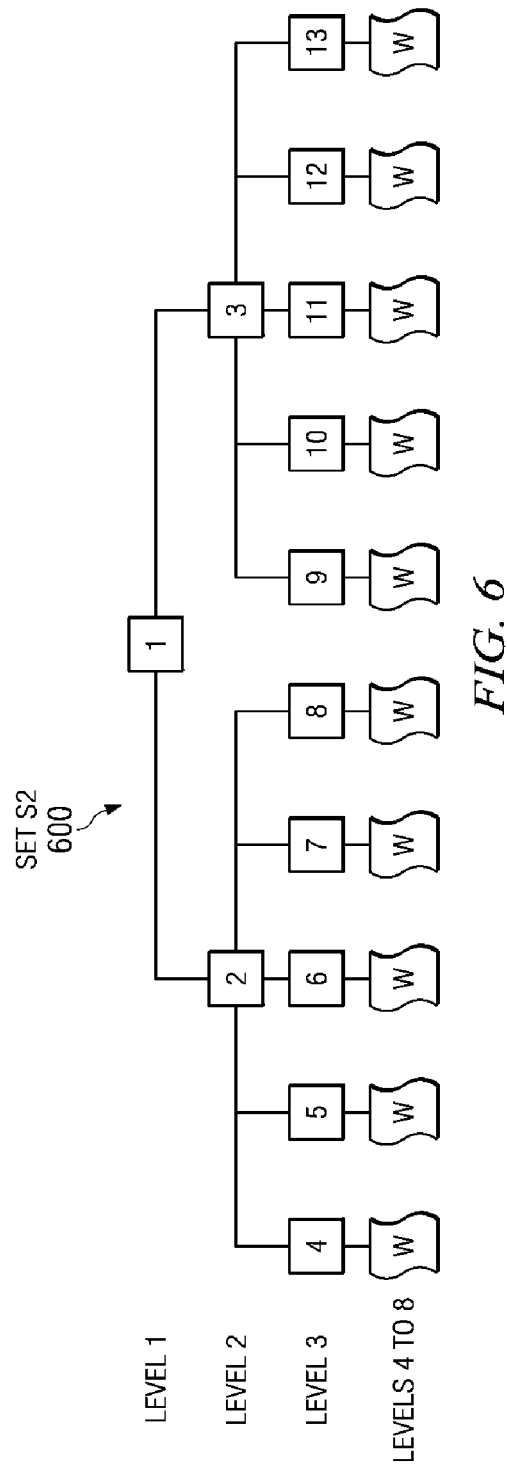

SOUNDING REFERENCE SIGNAL CELL SPECIFIC SUB-FRAME CONFIGURATION

CLAIM OF PRIORITY

This application claims priority under 35 U.S.C. 119(e)(1) to U.S. Provisional Application No. 61/039,571 filed Mar. 26, 2008, U.S. Provisional Application No. 61/040,752 filed Mar. 31, 2008, U.S. Provisional Application No. 61/041,694 filed Apr. 2, 2008, U.S. Provisional Application No. 61/044,636, and U.S. Provisional Application No. 61/045,421 filed Apr. 16, 2008.

TECHNICAL FIELD OF THE INVENTION

The technical field of this invention is wireless communication.

BACKGROUND OF THE INVENTION

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UE's data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

FIG. 2 shows the Evolved Universal Terrestrial Radio Access (E-UTRA) time division duplex (TDD) Frame Structure. Different sub-frames are allocated for downlink (DL) or uplink (UL) transmissions. Table 1 shows applicable DL/UL sub-frame allocations.

TABLE 1

| Con-figuration | Switch-point periodicity | \multicolumn{10}{c}{Sub-frame number} |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

SUMMARY OF THE INVENTION

This invention addresses the timing aspects of sounding reference signal (SRS) transmission, also with the goal of reducing SIB (broadcast) and the radio resource control (RRC) overhead. Overall, the parameters related to SRS timing are: SRS sub-frame configuration (SIB signaled); SRS duration (RRC signaled); SRS periodicity (RRC signaled) and sub-frame offset (RRC signaled).

BRIEF DESCRIPTION OF THE DRAWINGS

These and other aspects of this invention are illustrated in the drawings, in which:

FIG. 5 illustrates a first resource sharing tree for a first set of periodicities and offsets; and FIG. 6 illustrates a second resource sharing tree for a second set of periodicities and offsets.

DETAILED DESCRIPTION OF PREFERRED EMBODIMENTS

Figure 1:
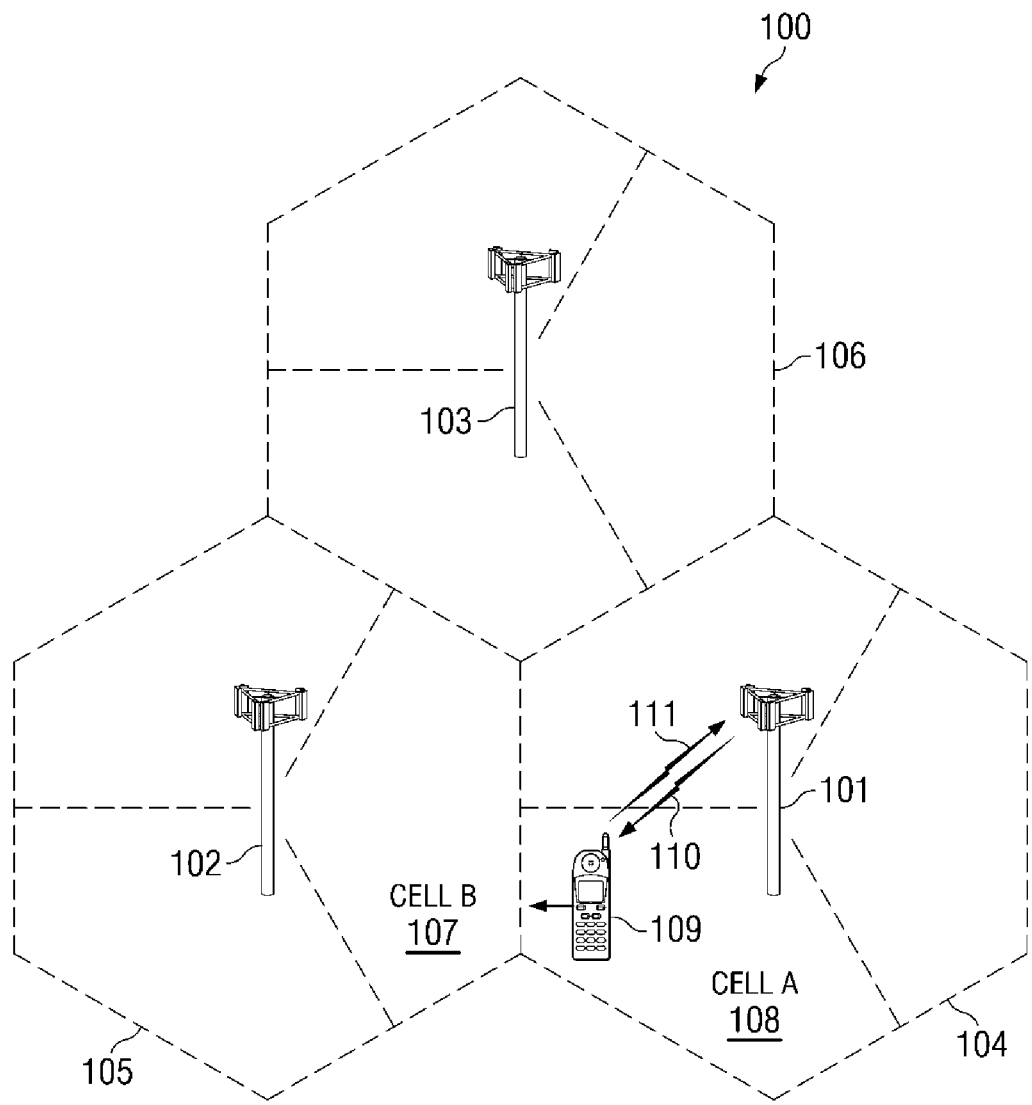
FIG. 1 is a diagram of a communication system of the prior art related to this invention having three cells.
Figure 2:
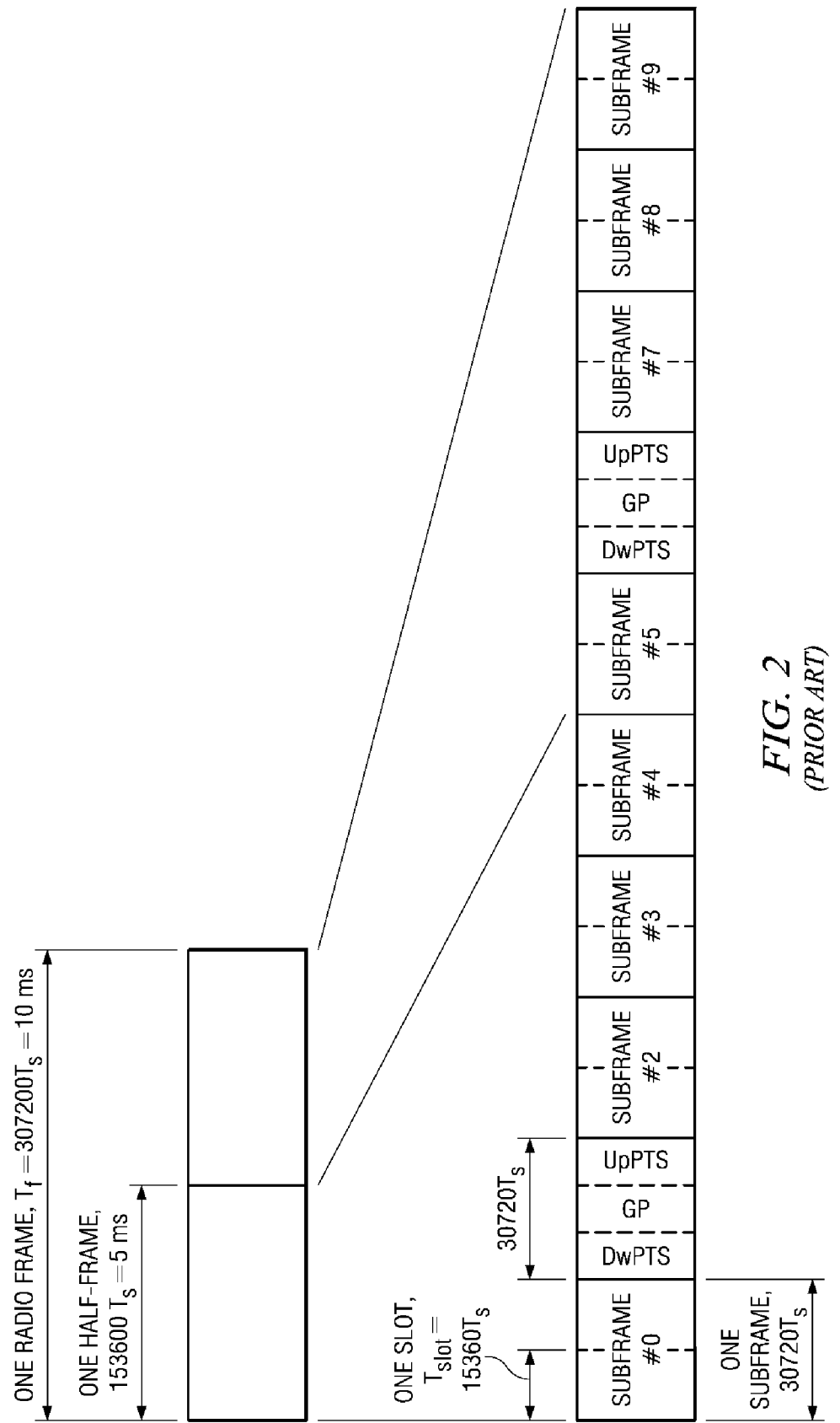
FIG. 2 shows the Evolved Universal Terrestrial Radio Access (E-UTRA) TDD Frame Structure of the prior art.

Sounding involves exchange of signals between the base station and the connected UE. Each sounding uses a reference resource identifier selected from an available reference resource identifier map h(t, L) and a portion of the spectrum selected from an available spectrum identifier map f(t, N); where L is a group of shared parameters signaled to each UE from the group; and N is a group of shared parameters signaled to each UE from the group. Some examples utilize Constant Amplitude Zero Auto-Correlation (CAZAC) sequences as the reference sequences. CAZAC sequences are complex-valued sequences with: constant amplitude (CA); and zero cyclic autocorrelation (ZAC). Examples of CAZAC sequences include: Chu sequences, Frank-Zadoff sequences, Zadoff-Chu (ZC) sequences and generalized chirp-like (GCL) sequences. CAZAC (ZC or otherwise) sequences are presently preferred.

In this invention each basestation 101, 102 and 103 transmits a sounding reference signal (SRS) to connected UEs 109 in the corresponding cell. The UE receiving the SRS then conducts sounding in accordance with the SRS sub-frame configuration.

The SRS sub-frame configuration is broadcast by basestation 101 in SIB. This sub-frame configuration indicates which sub-frames are SRS sub-frames. Broadcast of the SRS sub-frame configuration is useful even for UEs 109 which do not transmit any SRS. SRS shouldn't collide with physical uplink shared channel (PUSCH) transmission. Thus non-SRS UEs 109 can extract some of their silent symbol periods from the SRS sub-frame configuration. These silent periods are useful for performing some measurements at UE 109. In general each cell 107 and 108 would employ a different SRS sub-frame configuration. Ideally, basestations 101, 102 and 103 would select SRS sub-frame configurations to minimize cross-cell interference.

There are two main ways of signaling and interpreting the SRS sub-frame configuration parameters. Sub-frame configuration can be defined by two parameters: the periodicity $T_{SFC}$; and the offset $\Delta_{SFC}$. Both UEs 109 and basestation 101 keep a sub-frame counter $C_{SFC}$ permitting UE 109 and basestation 101 to determine which sub-frames are configured for SRS transmission. A sub-frame is an SRS sub-frame if and only if $\Delta_{SFC}=(C_{SFC})\bmod T_{SFC}$. The exact range of values of $\Delta_{SFC}$ and $T_{SFC}$ need to be defined with the number of bits and encoding for each. For example, $T_{SFC}$ could be selected from the set $\{1, 2, 3, 4, 5, \ldots, 32\}$ allowing flexible system deployment $\Delta_{SFC}$ could be selected from the same set. This yields maximum flexibility, but requires 10 bits of broadcast SIB signaling, which can be very costly. A reduced overhead alternative encodes and signals $T_{SFC}$ first. This requires greatest integer in $\log_2(T_{SFC})$ (ceil[$\log_2(T_{SFC})$]) bits. The bits required for $\Delta_{SFC}$ would be either the ceil[$\log_2(T_{SFC})$] or the least integer in $\log_2(T_{SFC})$ (floor[$\log_2(T_{SFC})$]) because $0 \leq \Delta_{SFC} < T_{SFC}$. This reduces the number of required bits for signaling $\Delta_{SFC}$, but only for certain scenarios where $T_{SFC}$ is small. Another reduced overhead alternative hard codes a value for $\Delta_{SFC}$ such as zero. In that case, only $T_{SFC}$ is signaled.

Several examples of combined $T_{SFC}$, $\Delta_{SFC}$ coding are listed in the following tables. In these examples the SRS sub-frame configuration is encoded using either 4 or 5 bits in SIB using joint source coding in $T_{SFC}$ and $\Delta_{SFC}$. Thus a unique 4 or 5 bit combination maps into a particular pair ($T_{SFC}$, $\Delta_{SFC}$).

Table 2 lists a 4 bit example suitable for use in frequency division duplex (FDD) systems.

TABLE 2

| Decimal | Binary | $T_{SFC}$ | $\Delta_{SFC}$ |
| --- | --- | --- | --- |
| 0 | 0000 | 1 | 0 |
| 1 | 0001 | 2 | 0 |
| 2 | 0010 | 2 | 1 |
| 3 | 0011 | 5 | 0 |
| 4 | 0100 | 5 | 1 |
| 5 | 0101 | 5 | 2 |
| 6 | 0110 | 10 | 0 |
| 7 | 0111 | 10 | 1 |
| 8 | 1000 | 10 | 2 |
| 9 | 1001 | 20 | 0 |
| 10 | 1010 | 20 | 1 |
| 11 | 1011 | 20 | 2 |
| 12 | 1100 | 40 | 0 |
| 13 | 1101 | 40 | 1 |
| 14 | 1110 | 40 | 2 |
| 15 | 1111 | Inf. | NA |

In Table 2 a coding of decimal 15 indicates no SRS thus $T_{SFC}$ is infinite, $\Delta_{SFC}$ is meaningless and not applicable (NA).

Table 3 lists another 4 bit example suitable for use in FDD systems.

TABLE 3

| Decimal | Binary | $T_{SFC}$ | $\Delta_{SFC}$ |
| --- | --- | --- | --- |
| 0 | 0000 | 1 | 0 |
| 1 | 0001 | 2 | 0 |
| 2 | 0010 | 2 | 1 |
| 3 | 0011 | 5 | 2 |
| 4 | 0100 | 5 | 3 |
| 5 | 0101 | 5 | 4 |
| 6 | 0110 | 10 | 5 |
| 7 | 0111 | 10 | 6 |
| 8 | 1000 | 10 | 7 |
| 9 | 1001 | 20 | 8 |
| 10 | 1010 | 20 | 9 |
| 11 | 1011 | 20 | 10 |
| 12 | 1100 | 40 | 11 |
| 13 | 1101 | 40 | 12 |
| 14 | 1110 | 40 | 13 |
| 15 | 1111 | Inf. | NA |

In Table 3 a coding of decimal 15 indicates no SRS thus $T_{SFC}$ is infinite, $\Delta_{SFC}$ is meaningless and not applicable (NA).

Table 4 lists a 5 bit example suitable for use in FDD systems.

TABLE 4

| Decimal | Binary | $T_{SFC}$ | $\Delta_{SFC}$ |
| --- | --- | --- | --- |
| 0 | 00000 | 1 | 0 |
| 1 | 00001 | 2 | 0 |
| 2 | 00010 | 2 | 1 |
| 3 | 00011 | 5 | 0 |
| 4 | 00100 | 5 | 1 |
| 5 | 00101 | 5 | 2 |
| 6 | 00110 | 5 | 3 |
| 7 | 00111 | 5 | 4 |
| 8 | 01000 | 10 | 0 |
| 9 | 01001 | 10 | 1 |
| 10 | 01010 | 10 | 2 |
| 11 | 01011 | 10 | 3 |
| 12 | 01100 | 10 | 4 |
| 13 | 01101 | 10 | 5 |
| 14 | 01110 | 10 | 6 |
| 15 | 01111 | 20 | 0 |
| 16 | 10000 | 20 | 1 |
| 17 | 10001 | 20 | 2 |
| 18 | 10010 | 20 | 3 |
| 19 | 10011 | 20 | 4 |
| 20 | 10100 | 20 | 5 |
| 21 | 10101 | 20 | 6 |
| 22 | 10110 | 40 | 0 |
| 23 | 10111 | 40 | 1 |
| 24 | 11000 | 40 | 2 |
| 25 | 11001 | 40 | 3 |
| 26 | 11010 | 40 | 4 |
| 27 | 11011 | 40 | 5 |
| 28 | 11100 | 40 | 6 |
| 29 | 11101 | Optional | |
| 30 | 11110 | Optional | |
| 31 | 11111 | Inf. | NA |

In Table 4 codings decimal 29 and 30 are optional and not defined in this example. In Table 4 a coding of decimal 31 indicates no SRS thus $T_{SFC}$ is infinite, $\Delta_{SFC}$ is meaningless and not applicable (NA).

Table 5 lists another 5 bit example suitable for use in FDD systems.

TABLE 5

| Decimal | Binary | $T_{SFC}$ | $\Delta_{SFC}$ |
| --- | --- | --- | --- |
| 0 | 00000 | 1 | 0 |
| 1 | 00001 | 2 | 0 |
| 2 | 00010 | 2 | 1 |
| 3 | 00011 | 5 | 0 |
| 4 | 00100 | 5 | 1 |
| 5 | 00101 | 5 | 2 |

TABLE 5-continued

| Decimal | Binary | $T_{SFC}$ | $\Delta_{SFC}$ |
|---|---|---|---|
| 6 | 00110 | 5 | 3 |
| 7 | 00111 | 5 | 4 |
| 8 | 01000 | 10 | 0 |
| 9 | 01001 | 10 | 1 |
| 10 | 01010 | 10 | 2 |
| 11 | 01011 | 10 | 3 |
| 12 | 01100 | 10 | 4 |
| 13 | 01101 | 10 | 5 |
| 14 | 01110 | 10 | 6 |
| 15 | 01111 | 10 | 7 |
| 16 | 10000 | 20 | 0 |
| 17 | 10001 | 20 | 1 |
| 18 | 10010 | 20 | 2 |
| 19 | 10011 | 20 | 3 |
| 20 | 10100 | 20 | 4 |
| 21 | 10101 | 20 | 5 |
| 22 | 10110 | 20 | 6 |
| 23 | 10111 | 20 | 7 |
| 24 | 11000 | 40 | 0 |
| 25 | 11001 | 40 | 1 |
| 26 | 11010 | 40 | 2 |
| 27 | 11011 | 40 | 3 |
| 28 | 11100 | 40 | 4 |
| 29 | 11101 | 40 | 5 |
| 30 | 11110 | 40 | 6 |
| 31 | 11111 | Inf. | NA |

In Table 5 a coding of decimal 31 indicates no SRS thus $T_{SFC}$ is infinite, $\Delta_{SFC}$ is meaningless and not applicable (NA).

Table 6 lists another 5 bit example suitable for use in FDD systems.

TABLE 6

| Decimal | Binary | $T_{SFC}$ | $\Delta_{SFC}$ |
|---|---|---|---|
| 0 | 00000 | 1 | 0 |
| 1 | 00001 | 2 | 0 |
| 2 | 00010 | 2 | 1 |
| 3 | 00011 | 5 | 0 |
| 4 | 00100 | 5 | 1 |
| 5 | 00101 | 5 | 2 |
| 6 | 00110 | 5 | 3 |
| 7 | 00111 | 5 | 4 |
| 8 | 01000 | 10 | 3 |
| 9 | 01001 | 10 | 4 |
| 10 | 01010 | 10 | 5 |
| 11 | 01011 | 10 | 6 |
| 12 | 01100 | 10 | 7 |
| 13 | 01101 | 10 | 8 |
| 14 | 01110 | 10 | 9 |
| 15 | 01111 | 20 | 10 |
| 16 | 10000 | 20 | 11 |
| 17 | 10001 | 20 | 12 |
| 18 | 10010 | 20 | 13 |
| 19 | 10011 | 20 | 14 |
| 20 | 10100 | 20 | 15 |
| 21 | 10101 | 20 | 16 |
| 22 | 10110 | 40 | 17 |
| 23 | 10111 | 40 | 18 |
| 24 | 11000 | 40 | 19 |
| 25 | 11001 | 40 | 20 |
| 26 | 11010 | 40 | 21 |
| 27 | 11011 | 40 | 22 |
| 28 | 11100 | 40 | 23 |
| 29 | 11101 | Optional | |
| 30 | 11110 | Optional | |
| 31 | 11111 | Inf. | NA |

In Table 6 codings decimal 29 and 30 are optional and not defined in this example. In Table 6 a coding of decimal 31 indicates no SRS thus $T_{SFC}$ is infinite, $\Delta_{SFC}$ is meaningless and not applicable (NA).

Table 7 lists a 4 bit example suitable for use in time division duplex (TDD) systems.

TABLE 7

| Decimal | Binary | $T_{SFC}$ | $\Delta_{SFC}$ |
|---|---|---|---|
| 0 | 0000 | 1 | 0 |
| 1 | 0001 | 5 | 1 (a) |
| 2 | 0010 | 5 | 1 (b) |
| 3 | 0011 | 5 | 2 |
| 4 | 0100 | 10 | 0 |
| 5 | 0101 | 10 | 1 (a) |
| 6 | 0110 | 10 | 1 (b) |
| 7 | 0111 | 10 | 2 |
| 8 | 1000 | 20 | 0 |
| 9 | 1001 | 20 | 1 (a) |
| 10 | 1010 | 20 | 1 (b) |
| 11 | 1011 | 20 | 2 |
| 12 | 1100 | 40 | 0 |
| 13 | 1101 | 40 | 1 (a) |
| 14 | 1110 | 40 | 1 (b) |
| 15 | 1111 | Inf. | NA |

In Table 7 codings decimal 1, 2, 5, 6, 9, 10, 13 and 14 are encoded with respect to Uplink Pilot Transmission Slot (UpPTS) orthogonal frequency division multiplexing (OFDM) symbols. If UpPTS contains two OFDM symbols: 1(a) means the first OFDM symbol is used for SRS to determine $\Delta_{SFC}$; and 1(b) means the second of OFDM symbol is used for SRS to determine $\Delta_{SFC}$. In Table 7 a coding of decimal 15 indicates no SRS thus $T_{SFC}$ is infinite, $\Delta_{SFC}$ is meaningless and not applicable (NA).

Table 8 lists a 5 bit example suitable for use in TDD systems.

TABLE 8

| Decimal | Binary | $T_{SFC}$ | $\Delta_{SFC}$ |
|---|---|---|---|
| 0 | 00000 | 1 | 0 |
| 1 | 00001 | 5 | 1 (a) |
| 2 | 00010 | 5 | 1 (b) |
| 3 | 00011 | 5 | 1 (a) + 1 (b) |
| 4 | 00100 | 5 | 2 |
| 5 | 00101 | 5 | 3 |
| 6 | 00110 | 5 | 4 |
| 7 | 00111 | 10 | 1 (a) |
| 8 | 01000 | 10 | 1 (b) |
| 9 | 01001 | 10 | 1 (a) + 1 (b) |
| 10 | 01010 | 10 | 2 |
| 11 | 01011 | 10 | 3 |
| 12 | 01100 | 10 | 4 |
| 13 | 01101 | 10 | 7 |
| 14 | 01110 | 10 | 8 |
| 15 | 01111 | 20 | 1 (a) |
| 16 | 10000 | 20 | 1 (b) |
| 17 | 10001 | 20 | 1 (a) + 1 (b) |
| 18 | 10010 | 20 | 2 |
| 19 | 10011 | 20 | 3 |
| 20 | 10100 | 20 | 4 |
| 21 | 10101 | 20 | 7 |
| 22 | 10110 | 20 | 8 |
| 23 | 10111 | 40 | 1 (a) |
| 24 | 11000 | 40 | 1 (b) |
| 25 | 11001 | 40 | 1 (a) + 1 (b) |
| 26 | 11010 | 40 | 2 |
| 27 | 11011 | 40 | 3 |
| 28 | 11100 | 40 | 4 |
| 29 | 11101 | 40 | 7 |
| 30 | 11110 | 40 | 8 |
| 31 | 11111 | Inf. | NA |

In Table 8 codings decimal 1, 2, 3, 7, 8, 9, 15, 16, 17, 23, 24 and 25 are encoded with respect to UpPTS OFDM symbols. If UpPTS contains two OFDM symbols: 1(a) means the first OFDM symbol is used for SRS to determine $\Delta_{SFC}$; 1(b) means the second of OFDM symbol is used for SRS to determine $\Delta_{SFC}$; and 1(a)+1(b) means that both OFDM symbols are used for SRS to determine $\Delta_{SFC}$. In Table 8 a coding of decimal 31 indicates no SRS thus $T_{SFC}$ is infinite, $\Delta_{SFC}$ is meaningless and not applicable (NA). For TDD, if the SRS sub-frame period is 1, all UL sub-frames and UpPTS can contain SRS. If UpPTS is used for short random access channel (RACH) transmission in some sub-frames, then there is no SRS. Thus basestation 101 does not assign any SRS UEs in RACH UpPTS sub-frames.

Table 9 lists another 5 bit example suitable for use in TDD systems.

TABLE 9

| Decimal | Binary | $T_{SFC}$ | $\Delta_{SFC}$ |
|---|---|---|---|
| 0 | 00000 | 1 | 0 |
| 1 | 00001 | 5 | 1 (a) |
| 2 | 00010 | 5 | 1 (b) |
| 3 | 00011 | 5 | 1 (a) + 1 (b) |
| 4 | 00100 | 5 | 2 |
| 5 | 00101 | 5 | 3 |
| 6 | 00110 | 5 | 4 |
| 7 | 00111 | 10 | 1 (a) |
| 8 | 01000 | 10 | 1 (b) |
| 9 | 01001 | 10 | 1 (a) + 1 (b) |
| 10 | 01010 | 10 | 2 |
| 11 | 01011 | 10 | 3 |
| 12 | 01100 | 10 | 6 (a) |
| 13 | 01101 | 10 | 6 (b) |
| 14 | 01110 | 10 | 6 (a) + 6 (b) |
| 15 | 01111 | 20 | 1 (a) |
| 16 | 10000 | 20 | 1 (b) |
| 17 | 10001 | 20 | 1 (a) + 1 (b) |
| 18 | 10010 | 20 | 2 |
| 19 | 10011 | 20 | 3 |
| 20 | 10100 | 20 | 6 (a) |
| 21 | 10101 | 20 | 6 (b) |
| 22 | 10110 | 20 | 6 (a) + 6 (b) |
| 23 | 10111 | 40 | 1 (a) |
| 24 | 11000 | 40 | 1 (b) |
| 25 | 11001 | 40 | 1 (a) + 1 (b) |
| 26 | 11010 | 40 | 2 |
| 27 | 11011 | 40 | 3 |
| 28 | 11100 | 40 | 6 (a) |
| 29 | 11101 | 40 | 6 (b) |
| 30 | 11110 | 40 | 6 (a) + 6 (b) |
| 31 | 11111 | Inf. | NA |

In Table 9 codings decimal 1, 2, 3, 7, 8, 9, 12 to 17, 20 to 25, 28, 29 and 30 are encoded with respect to UpPTS OFDM symbols. If UpPTS contains two OFDM symbols: 1(a) means the first OFDM symbol is used for SRS to determine $\Delta_{SFC}$; 1(b) means the second of OFDM symbol is used for SRS to determine $\Delta_{SFC}$; and 1(a)+1(b) means that both OFDM symbols are used for SRS to determine $\Delta_{SFC}$. In Table 8 a coding of decimal 31 indicates no SRS thus $T_{SFC}$ is infinite, $\Delta_{SFC}$ is meaningless and not applicable (NA).

Table 10 lists another 4 bit example suitable for use in FDD systems. Sounding reference signal sub-frames are the sub-frames satisfying $\lfloor n_s/2 \rfloor$ mod $T_{SFC} \in \Delta_{SFC}$.

TABLE 10

| Decimal | Binary | $T_{SFC}$ | $\Delta_{SFC}$ |
|---|---|---|---|
| 0 | 0000 | 1 | 0 |
| 1 | 0001 | 2 | 0 |
| 2 | 0010 | 2 | 1 |
| 3 | 0011 | 5 | 0 |
| 4 | 0100 | 5 | 1 |
| 5 | 0101 | 5 | 2 |
| 6 | 0110 | 5 | 3 |
| 7 | 0111 | 5 | 0, 1 |
| 8 | 1000 | 5 | 2, 3 |
| 9 | 1001 | 10 | 0 |
| 10 | 1010 | 10 | 1 |
| 11 | 1011 | 10 | 2 |
| 12 | 1100 | 10 | 3 |
| 13 | 1101 | 10 | 0, 1, 2, 3, 4, 6, 8 |
| 14 | 1110 | 10 | 0, 1, 2, 3, 4, 5, 6, 8 |
| 15 | 1111 | reserved | reserved |

Table 11 lists another 4 bit example suitable for use in TDD systems. Sounding reference signal sub-frames are the sub-frames satisfying $\lfloor n_s/2 \rfloor$ mod $T_{SFC} \in \Delta_{SFC}$. Sounding reference signals are transmitted only in configured UL sub-frames or UpPTS.

TABLE 11

| Decimal | Binary | $T_{SFC}$ | $\Delta_{SFC}$ |
|---|---|---|---|
| 0 | 0000 | 5 | 1 |
| 1 | 0001 | 5 | 1, 2 |
| 2 | 0010 | 5 | 1, 3 |
| 3 | 0011 | 5 | 1, 4 |
| 4 | 0100 | 5 | 1, 2, 3 |
| 5 | 0101 | 5 | 1, 2, 4 |
| 6 | 0110 | 5 | 1, 3, 4 |
| 7 | 0111 | 5 | 1, 2, 3, 4 |
| 8 | 1000 | 10 | 1, 2, 6 |
| 9 | 1001 | 10 | 1, 3, 6 |
| 10 | 1010 | 10 | 1, 6, 7 |
| 11 | 1011 | 10 | 1, 2, 6, 8 |
| 12 | 1100 | 10 | 1, 3, 6, 9 |
| 13 | 1101 | 10 | 1, 4, 6, 7 |
| 14 | 1110 | reserved | reserved |
| 15 | 1111 | reserved | reserved |

For TDD, a SRS sub-frame period of 1 means that all UL sub-frames and UpPTS can contain SRS. If UpPTS is used for short RACH transmission in some sub-frames, then there is no SRS. Thus basestation 101 does not assign any SRS UEs in RACH UpPTS sub-frames. For TDD, it is not clear how to have SRS sub-frame configuration with period 2.

Figure 3:
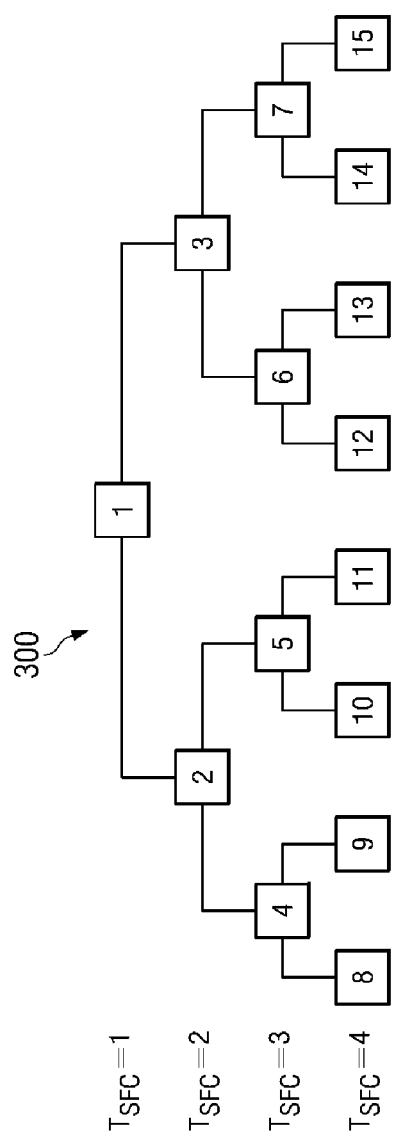
FIG. 3 illustrates a first example binary tree used in encoding.

Broadcasting both $\Delta_{SFC}$ and $T_{SFC}$ supports flexible SRS sub-frame configuration. Different values of $\Delta_{SFC}$ can be assigned in different cells. Thus SRS transmission in one cell does not interfere with a neighboring cells. Because the set of UL sub-frames varies with DL/UL sub-frame configuration, $\Delta_{SFC}$ is needed for SRS sub-frame configuration in TDD. Note binary tree 300 illustrates in FIG. 3 is just an example. Different trees can be used with different depths and configurations and different joint source-encodings of ($\Delta_{SFC}$, $T_{SFC}$).

FIG. 3 illustrates a manner of jointly encoding $\Delta_{SFC}$ and $T_{SFC}$ with an efficient source code to support multiple values for the offset $\Delta_{SFC}$ for each $T_{SFC}$ using an underlying structure. FIG. 3 illustrates a binary tree based structure 300. Binary tree 300 has exactly $2^x - 1$ nodes, where x is 4 in this example. Identifying any point on the binary tree requires exactly x bits, 4 bits in this example. A reserved codeword may be defined meaning no SRS, for example. Each node in the binary tree is assigned a mapping to a pair of ($\Delta_{SFC}$, $T_{SFC}$). The simplest mapping is that nodes at a certain depth are assigned a unique value of $T_{SFC}$. Referring to FIG. 3, for node 1 $T_{SFC}$=L, for nodes (2, 3) $T_{SFC}$=2, for nodes (4, 5, 6, 7) $T_{SFC}$=3, and for nodes (8, 9, 10, 11, 12, 13, 14 and 15) $T_{SFC}$=3. Thus the depth identifies $T_{SFC}$. In this example offset $\Delta_{SFC}$ is derived from the value of the node mod $T_{SFC}$. Such code is even simpler if we consider binary values for labeled nodes. The position of the most significant 1 bit in the binary value of a node equals the value of $T_{SFC}$. This is illustrated in FIG. 3. The remaining less significant bits identify offset $\Delta_{SFC}$. This same binary code can be used to encode frequency position (offset and bandwidth) of SRS.

Figure 4:
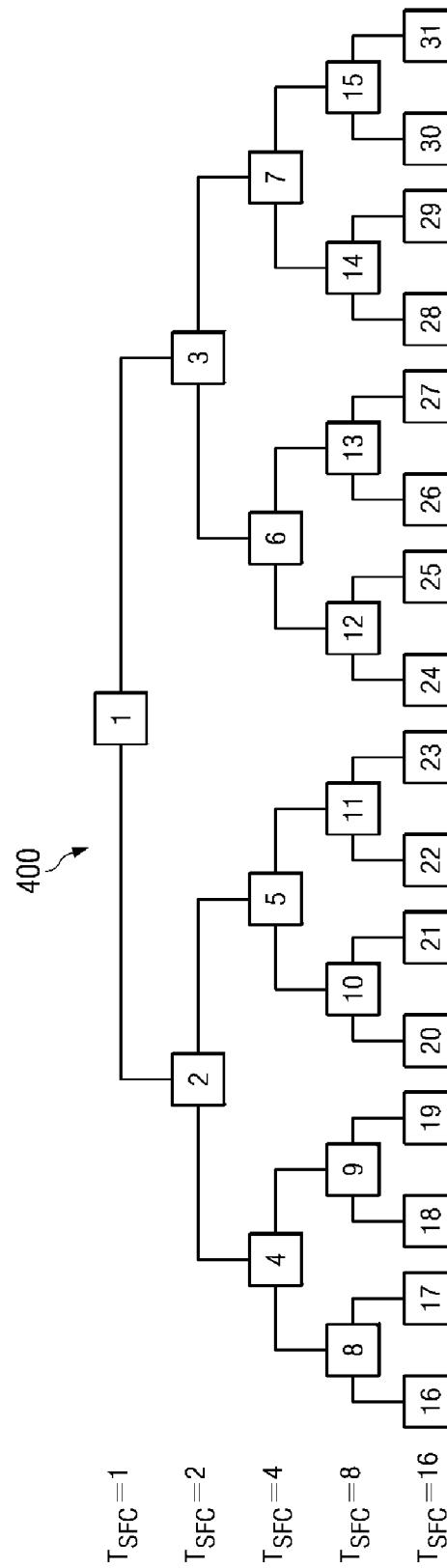
FIG. 4 illustrates a second example binary tree used in encoding.

FIG. 4 illustrates another embodiment of this invention. Binary tree 400 illustrated in FIG. 4 identifies sub-frames having periodicities $T_{SFC}$ of (1, 2, 4, 8, 16) ms. Each node in binary tree 400 is mapped to a pair of ($\Delta_{SFC}$, $T_{SFC}$). The simplest mapping assigns a unique value of $T_{SFC}$ to all nodes at a certain depth. FIG. 4 illustrates this assignment. A simple 5-bit code identifies the node. The position of most significant 1 identifies $T_{SFC}$ as $2^{(N-1)}$. The remaining bits identify the offset $\Delta_{SFC}$. If all 0 is signaled (00000), this identifies no SRS (infinity) or alternatively a one-shot SRS.

In another embodiment of the invention, the pair ($\Delta_{SFC}$, $T_{SFC}$) is coded jointly (source encoding) and broadcast in the SIB. In this embodiment the tree structure is not necessary. For example, if $T_{SFC}$ takes on values from the set (1, 2, 4, 5, 10) ms, then there are 1+2+4+5+10=22 possible values for the combination ($\Delta_{SFC}$, $T_{SFC}$). Each one of these combinations is mapped to a unique number Y out 22 numbers and can be represented by 5 bits. Broadcasting the unique number identifies the ($\Delta_{SFC}$, $T_{SFC}$) pair. Broadcasting the unique number could be in binary. In this example, 5 bits are need to represent the 22 possible values of Y. One option maps the range of Y into $T_{SFC}$. Then (Y)mod $T_{SFC}$ identifies $\Delta_{SFC}$.

Suppose $T_{SFC}$ can have values from the set ($A_1, A_2, \ldots, A_N$) ms. There are $A_1+A_2+\ldots+A_N$ values for the communicated number Y. This requires ceil[$\log_2(A_1+A_2+\ldots+A_N)$] bits to represent. The values of $T_{SFC}$ and $\Delta_{SFC}$ are encoded as follows. If Y is in the range 1 to $A_1$ then $T_{SFC}$ is $A_1$. If Y is in the range $1+A_1$ to $A_1+A_2$ then $T_{SFC}$ is $A_2$. If Y is in the range $1+A_1+\ldots+A_K$ to $A_1+\ldots+A_K+A_{K+1}$ then $T_{SFC}$ is $A_{K+1}$. The value of $\Delta_{SFC}$ is determined as (Y)mod $T_{SFC}$. Any remaining values of Y which do not map into ($\Delta_{SFC}$, $T_{SFC}$) can be used to communicate re-configuration, one-shot SRS or other options.

In another embodiment of the invention, the SRS sub-frame configuration may not be exactly qui-spaced. In this embodiment introduces another parameter $\delta_{SFC}$. Then, the SRS sub-frames are the sub-frames $C_{SFC}$ for which any of the following equations hold:

$$\Delta_{SFC} = C_{SFC} \bmod T_{SFC}$$

$$1 + \Delta_{SFC} = C_{SFC} \bmod T_{SFC}$$

$$2 + \Delta_{SFC} = C_{SFC} \bmod T_{SFC}$$

$$\delta_{SFC} + \Delta_{SFC} = C_{SFC} \bmod T_{SFC}$$

The value of the parameter $\delta_{SFC}$ can be pre-determined and fixed. In this case the value of $\delta_{SFC}$ can be inferred from the cell ID. Alternatively, the value of $\delta_{SFC}$ can be signaled in the SIB. As a further alternative, the value of $\delta_{SFC}$ can be encoded jointly or separately with $T_{SFC}$ and $\Delta_{SFC}$.

In other embodiments of the invention, multiple values for $T_{SFC}$, $\Delta_{SFC}$ and $\delta_{SFC}$ are possible. These values can also be broadcast via SIB.

RRC signaled SRS timing parameters include: duration having a range from one-shot to infinite; periodicity indicating the SRS transmission period from the UE 109; and sub-frame offset identifying the offset within the SRS transmission period from the UE.

In a first embodiment the RRC overhead for SRS timing parameters include: duration is one-shot to infinite and can be encoded in one bit; periodicity selected from (2, 5, 10, 20, 40, 80, 160, 320) ms which can be encoded in 3 bits; and sub-frame offset which must be designed according to the worst case of the longest possible periodicity thus requiring ceil [$\log_2(320)$] or 9 bits to encode. Thus the number of UE specific bits signaled via RRC to describe the SRS configuration in this example equals 1+3+9=13 bits. Since the cell wide sub-frame configuration is separate from the UE specific parameters listed above, there are either two possibilities.

The number of bits and source encoding required for UE specific parameters could depend on the actual sub-frame configuration transmitted via SIB. For example, if the sub-frame configuration notes every sub-frame is an SRS sub-frame, then 1+3+9=13 bits are required to specify the UE specific parameters. Alternatively, if the sub-frame configuration notes that every tenth sub-frame is an SRS sub-frame, then a smaller number of bits would be required to specify the UE specific parameters. This approach is more cumbersome. It likely would require a different definition of RRC configured parameters, depending on the sub-frame configuration. This would disadvantageously further complicate the specification. The number of bits required for UE specific RRC parameters can be independent of the actual sub-frame configuration transmitted via SIB. The worst case sub-frame configuration is when all sub-frames are SRS sub-frames. The number of RRC configured SRS timing parameters is this worst case is 1+3+9=13 bits.

In the second option there are two SRS periods that are not multiples of each other and cannot be multiplexed on a common SRS (frequency) resource. Possible SRS periods are selected from the set (2, 5, 10, 20, 40, 80, 160, 320) ms. Thus, since 2 ms and 5 ms cannot be multiplexed, any given SRS resource should be shared either with periodicities selected from the set S1 (5, 10, 20, 40, 80, 160, 320) ms or set S2 (2, 10, 20, 40, 80, 160, 320) ms. FIG. 5 illustrates a resource sharing tree 500 for set S1. Tree 500 for set S1 illustrated in FIG. 5 has 8 levels including node 1. Each W is a binary tree with 5 levels. The tree for set S1 has 1+5+10+20+40+80+160+320=636 nodes. This requires 10 bits to represent. Each node of the tree for set S1 encodes both the periodicity and the offset. There are 5 nodes at level 2 (2, 3, 4, 5, 6). Each of these nodes has a periodicity $T_{SFC}$ of 5 ms. The offset $\Delta_{SFC}$ increases from left to right via a one-to-one mapping from (2, 3, 4, 5, 6) to (0, 1, 2, 3, 4). This example is a simple subtraction of 2. Alternatively, it can be a mod 5 operation. At level 3, there are 10 nodes (7 to 16) each having a periodicity of 10 ms. Offsets $\Delta_{SFC}$ can be derived either via subtraction or a mod 10 operation as previously described.

Table 12 lists the relationship between SRS periodicity $T_{SFC}$ and the node index for set S1. The SRS periodicity $T_{SFC}$ can be extracted from the node index via a look-up table and a few comparisons. The SRS offset $\Delta_{SFC}$ can be extracted by performing (Node_Index)mod $T_{SFC}$. Thus SRS periodicity $T_{SFC}$ and the SRS offset $\Delta_{SFC}$ are easily found from node index.

TABLE 12

| | $T_{SFC}$ | | | | | | |
|---|---|---|---|---|---|---|---|
| | 5 ms | 10 ms | 20 ms | 40 ms | 80 ms | 160 ms | 320 ms |
| Node Index Range | 2-7 | 7-16 | 17-36 | 37-76 | 77-156 | 157-316 | 317-636 |

FIG. 6 illustrates resource sharing tree 600 for set S2. Tree 600 for set S2 has 8 levels and each W is a binary tree with 5 levels. Tree 600 for set S1 has 1+2+10+20+40+80+160+320=633 nodes. This requires 10 bits to represent. Each node of the tree encodes both periodicity $T_{SFC}$ and offset $\Delta_{SFC}$. There are 2 nodes at level 2 (2, 3). Each of these nodes has a periodicity $T_{SFC}$ of 2 ms. Offset $\Delta_{SFC}$ increases from left to right in a one-to-one mapping from (2, 3) to (0, 1). This could be implemented by a simple subtraction of 2. Alternatively, it can be a mod 2 operation. At level 3, there are 10 nodes (4 to 13) each having a periodicity $T_{SFC}$ of 10 ms. Offsets $\Delta_{SFC}$ can be derived either via subtraction or a mod 10 operation as previously described.

Table 13 lists the relationship between SRS periodicity $T_{SFC}$ and the node index for set S2 for two alternative codings. The SRS periodicity $T_{SFC}$ can be extracted from the node index via a look-up table and a few comparisons. The SRS offset $\Delta_{SFC}$ can be extracted by performing (Node_Index) mod $T_{SFC}$. Thus SRS periodicity $T_{SFC}$ and the SRS offset $\Delta_{SFC}$ are easily found from node index.

TABLE 13

| | $T_{SFC}$ | | | | | |
|---|---|---|---|---|---|---|
| | 2 ms | 10 ms | 20 ms | 40 ms | 80 ms | 160 ms | 320 ms |
| Node Index Range | 2-3 | 4-13<br>7-16 | 14-33<br>17-36 | 34-73<br>37-76 | 74-153<br>77-156 | 154-313<br>157-316 | 314-633<br>317-636 |

The designation of which tree is used (set S1 or set S2) can be implicitly tied to some other system parameter. For example, set S1 may be used for TDD and set S2 used for FDD. This choice may be tied to some alternate system parameters, broadcast via SIB or tied to some specific values of SRS sub-frame configuration. Thus the number of required RRC signaling bits can be reduced from 13 bits to 11 bits. This is about a 15% overhead reduction. This overhead reduction carries no penalty and is achieved by employing efficient source encoding of the periodicity and sub-frame offset. This set of embodiments reduces SIB and RRC signaling overhead for parameters related to SRS timing using efficient data structures such as trees. This overhead reduction is especially important for SIB signaling due to coverage issues.

What is claimed is:

1. A method of wireless communication including a plurality of fixed basestations and a plurality of mobile user equipment comprising the steps of:
   each fixed basestation transmitting to any mobile user equipment within a corresponding cell a sounding reference signal sub-frame configuration indicating sub-frames when sounding is permitted, said transmitting including
   transmitting a periodicity $T_{SFC}$, and
   transmitting an offset $\Delta_{SFC}$;
   each mobile user equipment within said corresponding cell recognizing said sounding reference signal sub-frame configuration; and
   each mobile user equipment sounding only at sub-frames when sounding is permitted according to said recognized sounding reference signal sub-frame configuration, said sounding including
   maintaining a sub-frame count $C_{SFC}$, and
   sounding only if $\Delta_{SFC}=(C_{SFC})\bmod T_{SFC}$.

2. The method of claim 1, wherein:
   said step of each fixed basestation transmitting a sounding reference signal sub-frame configuration wherein differing fixed basestations may transmit differing sounding reference signal sub-frame configurations.

3. The method of claim 1, wherein:
   said steps of transmitting said periodicity $T_{SFC}$ and transmitting said offset $\Delta_{SFC}$ includes separately coding said periodicity $T_{SFC}$ and said offset $\Delta_{SFC}$.

4. The method of claim 1, wherein:
   said steps of transmitting said periodicity $T_{SFC}$ and transmitting said offset $\Delta_{SFC}$ includes jointly coding said periodicity $T_{SFC}$ and said offset $\Delta_{SFC}$.

5. The method of claim 4, wherein:
   Said step of jointly coding said periodicity $T_{SFC}$ and said offset $\Delta_{SFC}$ codes in 4 bits suitable for use in frequency division duplex systems as follows:

| Decimal | Binary | $T_{SFC}$ | $\Delta_{SFC}$ |
|---|---|---|---|
| 0 | 0000 | 1 | 0 |
| 1 | 0001 | 2 | 0 |
| 2 | 0010 | 2 | 1 |
| 3 | 0011 | 5 | 0 |
| 4 | 0100 | 5 | 1 |
| 5 | 0101 | 5 | 2 |
| 6 | 0110 | 10 | 0 |
| 7 | 0111 | 10 | 1 |
| 8 | 1000 | 10 | 2 |
| 9 | 1001 | 20 | 0 |
| 10 | 1010 | 20 | 1 |
| 11 | 1011 | 20 | 2 |
| 12 | 1100 | 40 | 0 |
| 13 | 1101 | 40 | 1 |
| 14 | 1110 | 40 | 2 |
| 15 | 1111 | Inf. | NA | where: coding of decimal 15 indicates no sounding reference signal (SRS) thus $T_{SFC}$, $\Delta_{SFC}$ is meaningless and not applicable (NA).

6. The method of claim 4, wherein:
   said step of jointly coding said periodicity and said offset $\Delta_{SFC}$ codes in 4 bits suitable for use in frequency division duplex systems as follows:

| Decimal | Binary | $T_{SFC}$ | $\Delta_{SFC}$ |
|---|---|---|---|
| 0 | 0000 | 1 | 0 |
| 1 | 0001 | 2 | 0 |
| 2 | 0010 | 2 | 1 |
| 3 | 0011 | 5 | 2 |
| 4 | 0100 | 5 | 3 |
| 5 | 0101 | 5 | 4 |
| 6 | 0110 | 10 | 5 |
| 7 | 0111 | 10 | 6 |
| 8 | 1000 | 10 | 7 |
| 9 | 1001 | 20 | 8 |
| 10 | 1010 | 20 | 9 |
| 11 | 1011 | 20 | 10 |
| 12 | 1100 | 40 | 11 |
| 13 | 1101 | 40 | 12 |
| 14 | 1110 | 40 | 13 |
| 15 | 1111 | Inf. | NA | where: a coding of decimal 15 indicates no sounding reference signal (SRS) thus $T_{SFC}$ is infinite, $\Delta_{SFC}$ is meaningless and not applicable (NA).

7. The method of claim 4, wherein:
   Said step of jointly coding said $T_{SFC}$ and said offset $\Delta_{SFC}$ codes 5 bits suitable for use in a frequency division duplex system is as follows:

| Decimal | Binary | $T_{SFC}$ | $\Delta_{SFC}$ |
|---------|--------|-----------|----------------|
| 0 | 00000 | 1 | 0 |
| 1 | 00001 | 2 | 0 |
| 2 | 00010 | 2 | 1 |
| 3 | 00011 | 5 | 0 |
| 4 | 00100 | 5 | 1 |
| 5 | 00101 | 5 | 2 |
| 6 | 00110 | 5 | 3 |
| 7 | 00111 | 5 | 4 |
| 8 | 01000 | 10 | 0 |
| 9 | 01001 | 10 | 1 |
| 10 | 01010 | 10 | 2 |
| 11 | 01011 | 10 | 3 |
| 12 | 01100 | 10 | 4 |
| 13 | 01101 | 10 | 5 |
| 14 | 01110 | 10 | 6 |
| 15 | 01111 | 20 | 0 |
| 16 | 10000 | 20 | 1 |
| 17 | 10001 | 20 | 2 |
| 18 | 10010 | 20 | 3 |
| 19 | 10011 | 20 | 4 |
| 20 | 10100 | 20 | 5 |
| 21 | 10101 | 20 | 6 |
| 22 | 10110 | 40 | 0 |
| 23 | 10111 | 40 | 1 |
| 24 | 11000 | 40 | 2 |
| 25 | 11001 | 40 | 3 |
| 26 | 11010 | 40 | 4 |
| 27 | 11011 | 40 | 5 |
| 28 | 11100 | 40 | 6 |
| 29 | 11101 | Optional | |
| 30 | 11110 | Optional | |
| 31 | 11111 | Inf. | NA | where: coding of decimal 29 and 30 are not defined; and a coding of decimal 31 indicates no sounding reference signal (SRS) thus $T_{SFC}$ is infinite, $\Delta_{SFC}$ is meaningless and not applicable (NA).

8. The method of claim 4, wherein:

said step of jointly coding said periodicity $T_{SFC}$ and said offset $\Delta_{SFC}$ codes in 5 bits suitable for use in frequency division duplex systems as follows:

| Decimal | Binary | $T_{SFC}$ | $\Delta_{SFC}$ |
|---------|--------|-----------|----------------|
| 0 | 00000 | 1 | 0 |
| 1 | 00001 | 2 | 0 |
| 2 | 00010 | 2 | 1 |
| 3 | 00011 | 5 | 0 |
| 4 | 00100 | 5 | 1 |
| 5 | 00101 | 5 | 2 |
| 6 | 00110 | 5 | 3 |
| 7 | 00111 | 5 | 4 |
| 8 | 01000 | 10 | 0 |
| 9 | 01001 | 10 | 1 |
| 10 | 01010 | 10 | 2 |
| 11 | 01011 | 10 | 3 |
| 12 | 01100 | 10 | 4 |
| 13 | 01101 | 10 | 5 |
| 14 | 01110 | 10 | 6 |
| 15 | 01111 | 10 | 7 |
| 16 | 10000 | 20 | 0 |
| 17 | 10001 | 20 | 1 |
| 18 | 10010 | 20 | 2 |
| 19 | 10011 | 20 | 3 |
| 20 | 10100 | 20 | 4 |
| 21 | 10101 | 20 | 5 |
| 22 | 10110 | 20 | 6 |
| 23 | 10111 | 20 | 7 |
| 24 | 11000 | 40 | 0 |
| 25 | 11001 | 40 | 1 |
| 26 | 11010 | 40 | 2 |
| 27 | 11011 | 40 | 3 |
| 28 | 11100 | 40 | 4 |
| 29 | 11101 | 40 | 5 |
| 30 | 11110 | 40 | 6 |
| 31 | 11111 | Inf. | NA | where: a coding of decimal 31 indicates no SRS thus $T_{SFC}$ is infinite, $\Delta_{SFC}$ is meaningless and not applicable (NA).

9. The method of claim 4, wherein:

said step of jointly coding said periodicity $T_{SFC}$ and said offset $\Delta_{SFC}$ codes in 5 bits suitable for use in a frequency division duplex system as follows:

| Decimal | Binary | $T_{SFC}$ | $\Delta_{SFC}$ |
|---------|--------|-----------|----------------|
| 0 | 00000 | 1 | 0 |
| 1 | 00001 | 2 | 0 |
| 2 | 00010 | 2 | 1 |
| 3 | 00011 | 5 | 0 |
| 4 | 00100 | 5 | 1 |
| 5 | 00101 | 5 | 2 |
| 6 | 00110 | 5 | 3 |
| 7 | 00111 | 5 | 4 |
| 8 | 01000 | 10 | 3 |
| 9 | 01001 | 10 | 4 |
| 10 | 01010 | 10 | 5 |
| 11 | 01011 | 10 | 6 |
| 12 | 01100 | 10 | 7 |
| 13 | 01101 | 10 | 8 |
| 14 | 01110 | 10 | 9 |
| 15 | 01111 | 20 | 10 |
| 16 | 10000 | 20 | 11 |
| 17 | 10001 | 20 | 12 |
| 18 | 10010 | 20 | 13 |
| 19 | 10011 | 20 | 14 |
| 20 | 10100 | 20 | 15 |
| 21 | 10101 | 20 | 16 |
| 22 | 10110 | 40 | 17 |
| 23 | 10111 | 40 | 18 |
| 24 | 11000 | 40 | 19 |
| 25 | 11001 | 40 | 20 |
| 26 | 11010 | 40 | 21 |
| 27 | 11011 | 40 | 22 |
| 28 | 11100 | 40 | 23 |
| 29 | 11101 | Optional | |
| 30 | 11110 | Optional | |
| 31 | 11111 | Inf. | NA | where: codings decimal 29 and 30 are not defined; and a coding of decimal 31 indicates no SRS thus $T_{SFC}$ is infinite, $\Delta_{SFC}$ is meaningless and not applicable (NA).

10. The method of claim 4, wherein:

said step of jointly coding said periodicity $T_{SFC}$ and said offset $\Delta_{SFC}$ codes in 4 bits suitable for use in time division duplex systems as follows:

| Decimal | Binary | $T_{SFC}$ | $\Delta_{SFC}$ |
|---------|--------|-----------|----------------|
| 0 | 0000 | 1 | 0 |
| 1 | 0001 | 5 | 1 (a) |
| 2 | 0010 | 5 | 1 (b) |
| 3 | 0011 | 5 | 2 |
| 4 | 0100 | 10 | 0 |
| 5 | 0101 | 10 | 1 (a) |
| 6 | 0110 | 10 | 1 (b) |
| 7 | 0111 | 10 | 2 |
| 8 | 1000 | 20 | 0 |
| 9 | 1001 | 20 | 1 (a) |
| 10 | 1010 | 20 | 1 (b) |

-continued

| Decimal | Binary | $T_{SFC}$ | $\Delta_{SFC}$ |
|---|---|---|---|
| 11 | 1011 | 20 | 2 |
| 12 | 1100 | 40 | 0 |
| 13 | 1101 | 40 | 1 (a) |
| 14 | 1110 | 40 | 1 (b) |
| 15 | 1111 | Inf. | NA | where: codings decimal 1, 2, 5, 6, 9, 10, 13 and 14 are encoded with respect to UpPTS orthogonal frequency division multiplexing OFDM symbols with 1(a) meaning a first OFDM symbol determines $\Delta_{SFC}$ and with 1(b) meaning a second OFDM symbol determines $\Delta_{SFC}$; and a coding of decimal 15 indicates no SRS thus $T_{SFC}$ is infinite, $\Delta_{SFC}$ is meaningless and not applicable (NA).

11. The method of claim 4, wherein:
said step of jointly coding said periodicity $T_{SFC}$ and said offset $\Delta_{SFC}$ codes in 5 bits suitable for use in time division multiplex systems as follows:

| Decimal | Binary | $T_{SFC}$ | $\Delta_{SFC}$ |
|---|---|---|---|
| 0 | 00000 | 1 | 0 |
| 1 | 00001 | 5 | 1 (a) |
| 2 | 00010 | 5 | 1 (b) |
| 3 | 00011 | 5 | 1 (a) + 1 (b) |
| 4 | 00100 | 5 | 2 |
| 5 | 00101 | 5 | 3 |
| 6 | 00110 | 5 | 4 |
| 7 | 00111 | 10 | 1 (a) |
| 8 | 01000 | 10 | 1 (b) |
| 9 | 01001 | 10 | 1 (a) + 1 (b) |
| 10 | 01010 | 10 | 2 |
| 11 | 01011 | 10 | 3 |
| 12 | 01100 | 10 | 4 |
| 13 | 01101 | 10 | 7 |
| 14 | 01110 | 10 | 8 |
| 15 | 01111 | 20 | 1 (a) |
| 16 | 10000 | 20 | 1 (b) |
| 17 | 10001 | 20 | 1 (a) + 1 (b) |
| 18 | 10010 | 20 | 2 |
| 19 | 10011 | 20 | 3 |
| 20 | 10100 | 20 | 4 |
| 21 | 10101 | 20 | 7 |
| 22 | 10110 | 20 | 8 |
| 23 | 10111 | 40 | 1 (a) |
| 24 | 11000 | 40 | 1 (b) |
| 25 | 11001 | 40 | 1 (a) + 1 (b) |
| 26 | 11010 | 40 | 2 |
| 27 | 11011 | 40 | 3 |
| 28 | 11100 | 40 | 4 |
| 29 | 11101 | 40 | 7 |
| 30 | 11110 | 40 | 8 |
| 31 | 11111 | Inf. | NA | where: codings decimal 1, 2, 3, 7, 8, 9, 15, 16, 17, 23, 24 and 25 are encoded with respect to UpPTS orthogonal frequency division multiplexing OFDM symbols with 1(a) meaning a first OFDM symbol determines $\Delta_{SFC}$, with 1(b) meaning a second OFDM symbol determines $\Delta_{SFC}$ and with 1(a)+1(b) meaning that both OFDM symbols determines $\Delta_{SFC}$; and a coding of decimal 31 indicates no SRS thus $T_{SFC}$ is infinite, $\Delta_{SFC}$ is meaningless and not applicable (NA).

12. The method of claim 4, wherein:
said step of jointly coding said periodicity $T_{SFC}$ and said offset $\Delta_{SFC}$ codes in 5 bits suitable for use in time division multiplex systems as follows:

| Decimal | Binary | $T_{SFC}$ | $\Delta_{SFC}$ |
|---|---|---|---|
| 0 | 00000 | 1 | 0 |
| 1 | 00001 | 5 | 1 (a) |
| 2 | 00010 | 5 | 1 (b) |
| 3 | 00011 | 5 | 1 (a) + 1 (b) |
| 4 | 00100 | 5 | 2 |
| 5 | 00101 | 5 | 3 |
| 6 | 00110 | 5 | 4 |
| 7 | 00111 | 10 | 1 (a) |
| 8 | 01000 | 10 | 1 (b) |
| 9 | 01001 | 10 | 1 (a) + 1 (b) |
| 10 | 01010 | 10 | 2 |
| 11 | 01011 | 10 | 3 |
| 12 | 01100 | 10 | 6 (a) |
| 13 | 01101 | 10 | 6 (b) |
| 14 | 01110 | 10 | 6 (a) + 6 (b) |
| 15 | 01111 | 20 | 1 (a) |
| 16 | 10000 | 20 | 1 (b) |
| 17 | 10001 | 20 | 1 (a) + 1 (b) |
| 18 | 10010 | 20 | 2 |
| 19 | 10011 | 20 | 3 |
| 20 | 10100 | 20 | 6 (a) |
| 21 | 10101 | 20 | 6 (b) |
| 22 | 10110 | 20 | 6 (a) + 6 (b) |
| 23 | 10111 | 40 | 1 (a) |
| 24 | 11000 | 40 | 1 (b) |
| 25 | 11001 | 40 | 1 (a) + 1 (b) |
| 26 | 11010 | 40 | 2 |
| 27 | 11011 | 40 | 3 |
| 28 | 11100 | 40 | 6 (a) |
| 29 | 11101 | 40 | 6 (b) |
| 30 | 11110 | 40 | 6 (a) + 6 (b) |
| 31 | 11111 | Inf. | NA | where: codings decimal 1, 2, 3, 7, 8, 9, 12 to 17, 20 to 25, 28, 29 and 30 are encoded with respect to UpPTS orthogonal frequency division multiplexing OFDM symbols with 1(a) meaning a first OFDM symbol determines $\Delta_{SFC}$, with 1(b) meaning a second OFDM symbol determines $\Delta_{SFC}$ and with 1(a)+1(b) meaning that both OFDM symbols determines $\Delta_{SFC}$; and a coding of decimal 31 indicates no SRS thus $T_{SFC}$ is infinite, $\Delta_{SFC}$ is meaningless and not applicable (NA).

13. The method of claim 4, wherein:
said step of jointly coding said periodicity $T_{SFC}$ and said offset $\Delta_{SFC}$ codes in 4 its suitable for use in frequency division multiplex systems as follows:

| Decimal | Binary | $T_{SFC}$ | $\Delta_{SFC}$ |
|---|---|---|---|
| 0 | 0000 | 1 | 0 |
| 1 | 0001 | 2 | 0 |
| 2 | 0010 | 2 | 1 |
| 3 | 0011 | 5 | 0 |
| 4 | 0100 | 5 | 1 |
| 5 | 0101 | 5 | 2 |
| 6 | 0110 | 5 | 3 |
| 7 | 0111 | 5 | 0, 1 |
| 8 | 1000 | 5 | 2, 3 |
| 9 | 1001 | 10 | 0 |
| 10 | 1010 | 10 | 1 |
| 11 | 1011 | 10 | 2 |
| 12 | 1100 | 10 | 3 |
| 13 | 1101 | 10 | 0, 1, 2, 3, 4, 6, 8 |
| 14 | 1110 | 10 | 0, 1, 2, 3, 4, 5, 6, 8 |
| 15 | 1111 | reserved | reserved | where: sounding reference signal sub-frames satisfy $\lfloor n_s/2 \rfloor$ mod $T_{SFC} \in \Delta_{SFC}$.

14. The method of claim 4, wherein:
said step of jointly coding said periodicity $T_{SFC}$ and said offset $\Delta_{SFC}$ codes in 4 its suitable for use in time division multiplex systems as follows:

| Decimal | Binary | $T_{SFC}$ | $\Delta_{SFC}$ |
|---------|--------|-----------|----------------|
| 0  | 0000 | 5 | 1 |
| 1  | 0001 | 5 | 1, 2 |
| 2  | 0010 | 5 | 1, 3 |
| 3  | 0011 | 5 | 1, 4 |
| 4  | 0100 | 5 | 1, 2, 3 |
| 5  | 0101 | 5 | 1, 2, 4 |
| 6  | 0110 | 5 | 1, 3, 4 |
| 7  | 0111 | 5 | 1, 2, 3, 4 |
| 8  | 1000 | 10 | 1, 2, 6 |
| 9  | 1001 | 10 | 1, 3, 6 |
| 10 | 1010 | 10 | 1, 6, 7 |
| 11 | 1011 | 10 | 1, 2, 6, 8 |
| 12 | 1100 | 10 | 1, 3, 6, 9 |
| 13 | 1101 | 10 | 1, 4, 6, 7 |
| 14 | 1110 | reserved | reserved |
| 15 | 1111 | reserved | reserved | where: sounding reference signal sub-frames are the sub-frames satisfying $\lfloor n_s/2 \rfloor \bmod T_{SFC} \in \Delta_{SFC}$; and sounding reference signals are transmitted only in configured UL sub-frames or UpPTS.

15. The method of claim 4, wherein:
said step of jointly coding said periodicity $T_{SFC}$ and said offset $\Delta_{SFC}$ includes
forming a tree structure with a number of levels corresponding to a number of permitted periodicities $T_{SFC}$ and a number of nodes within each level corresponding to a number of permitted corresponding offsets $\Delta_{SFC}$;
numbering nodes of said tree structure starting with 1 at a base node and numbering a level in left to right order before numbering a next level, and
transmitting a corresponding node number.

16. The method according to claim 15, wherein:
said step of each mobile user equipment within recognizing said sounding reference signal sub-frame configuration includes
recognizing a periodicity $T_{SFC}$ from said tree level of said node number, and
recognizing an offset $\Delta_{SFC}$ dependent on said node number.

17. The method according to claim 16, wherein:
said step of recognizing an offset $\Delta_{SFC}$ dependent on said node number includes subtracting a constant from said node number and mapping a difference to a particular offset $\Delta_{SFC}$.

18. The method according to claim 16, wherein:
said step of recognizing an offset $\Delta_{SFC}$ dependent on said node number sets said offset $\Delta_{SFC}$ to (node number) modulo $T_{SFC}$.

19. The method of claim 1, wherein:
said step of each fixed basestation transmitting a sounding reference signal sub-frame configuration further includes
transmitting a parameter $\delta_{SFC}$;
said step of each mobile user equipment sounding only at sub-frames when sounding is permitted further includes sounding if $\Delta_{SFC} = (C_{SFC}) \bmod T_{SFC}$, $1 + \Delta_{SFC} = (C_{SFC}) \bmod T_{SFC}$, $2 + \Delta_{SFC} = (C_{SFC}) \bmod T_{SFC}$, or $\delta_{SFC} + \Delta_{SFC} = (C_{SFC}) \bmod T_{SFC}$.

20. The method of claim 19, wherein:
said parameter $\delta_{SFC}$ is a predetermined constant.

21. The method of claim 19, wherein:
said parameter $\delta_{SFC}$ is inferred from a cell ID.

22. The method of claim 19, wherein:
said steps of transmitting said periodicity $T_{SFC}$, transmitting said offset $\Delta_{SFC}$ and transmitting a parameter $\delta_{SFC}$ includes separately coding said periodicity $T_{SFC}$, said offset $\Delta_{SFC}$ and said parameter $\delta_{SFC}$.

23. The method of claim 19, wherein:
said steps of transmitting said periodicity $T_{SFC}$, transmitting said offset $\Delta_{SFC}$ and transmitting a parameter $\delta_{SFC}$ includes jointly coding said periodicity $T_{SFC}$, said offset $\Delta_{SFC}$ and said parameter $\delta_{SFC}$.

* * * * *